United States Patent [19]

Schlueter et al.

[11] 4,408,573

[45] Oct. 11, 1983

[54] SYSTEM AND METHOD FOR SUPERHEATED-WATER INJECTION SYSTEM (SWIS)

[76] Inventors: William B. Schlueter, Rte. 3, Box 174, Big Pine Key, Fla. 33043; Ignacio D. Debuque, Jr., 9 Ermin Garcia St., Cubao, Quezon City, Philippines

[21] Appl. No.: 310,208

[22] Filed: Oct. 9, 1981

[30] Foreign Application Priority Data

Oct. 14, 1980 [PH] Philippines ............................... 24719

[51] Int. Cl.³ .......................................... F02M 25/02
[52] U.S. Cl. ............................. 123/25 P; 123/25 C; 123/25 D
[58] Field of Search ................. 123/25 B, 25 D, 25 P, 123/1 R, 25 C

[56] References Cited

U.S. PATENT DOCUMENTS

| | | | |
|---|---|---|---|
| 1,068,414 | 7/1913 | Courtenay | 123/25 P |
| 1,245,188 | 11/1917 | Buckwalter | 123/25 D |
| 1,675,702 | 7/1928 | Fuller | 123/25 D |
| 2,671,311 | 3/1954 | Rohrbach | 123/25 C |
| 4,122,803 | 10/1978 | Miller | 123/25 D |

FOREIGN PATENT DOCUMENTS 2713831 10/1978 Fed. Rep. of Germany ... 123/25 D

*Primary Examiner*—Ira S. Lazarus
*Attorney, Agent, or Firm*—James A. Wong

[57] ABSTRACT

System and method for a superheated-water injection system (SWIS). The system is designed to superheat water to temperatures exceeding 212° F. (100° C.) under conditions of pressure to prevent it from boiling for the purpose of injecting a timed and metered volume of such superheated water directly into the firing chamber of an internal combustion engine (whether spark-ignited, diesel, turbine or jet) to produce usable steam incremental to the work-force developed by such engine through combustion.

2 Claims, 2 Drawing Figures

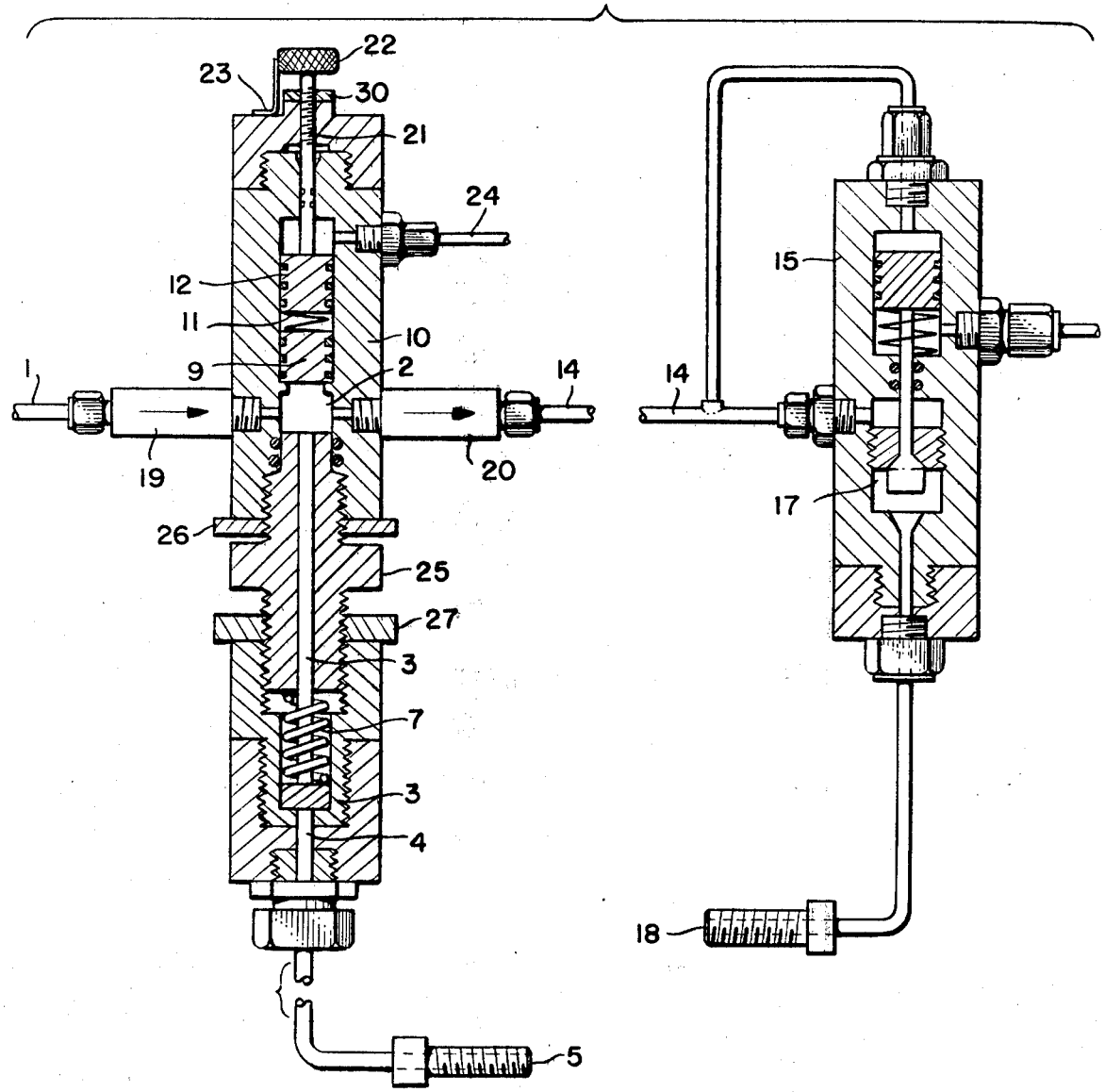

SYSTEM AND METHOD FOR SUPERHEATED-WATER INJECTION SYSTEM (SWIS)

FIELD OF INVENTION

The subject invention is one of the devices developed by the applicants in the course of their search for more energy-efficient and cleaner engines or power systems. More specifically, the system applied for patent is designed for use with an internal combustion engine (whether spark-ignited, diesel, turbine or jet) for the specific purpose of generating usable steam during the process of combustion, such steam to produce a workforce incremental to and separate from that developed by combusting fuel. As such, the superheated-water injection system constitutes one of the most, if not the most, important component in the design of certain types of hybrid internal combustion-steam engines which are themselves the subject of separate patents.

PRINCIPLES UTILIZED BY INVENTION

The subject invention has been conceived as an application of the following well-known facts and physical principles, viz.:

1. Water at a given pressure when heated to a certain temperature flashes into steam;
2. An internal combustion engine at the moment of firing would invariably produce enough heat and pressure to flash into steam any water contained in the cylinder;
3. Water when flashed into steam expands to approximately 1,600 times its original volume.
4. Water heated under pressure conditions can attain superheat temperatures far in excess of 212° F. (100° C.) without boiling;
5. If such superheated water is released into an atmosphere containing less pressure than that under which such water has been brought to a superheat, it will flash into superheated steam producing harnessable power.

DESCRIPTION OF DRAWINGS

FIG. 2 shows the internal working of the SWIS power unit and injector which regulate the volume and timing of the superheated water discharged into the engine's combustion chamber.

DESCRIPTION OF INVENTION

Figure 1:
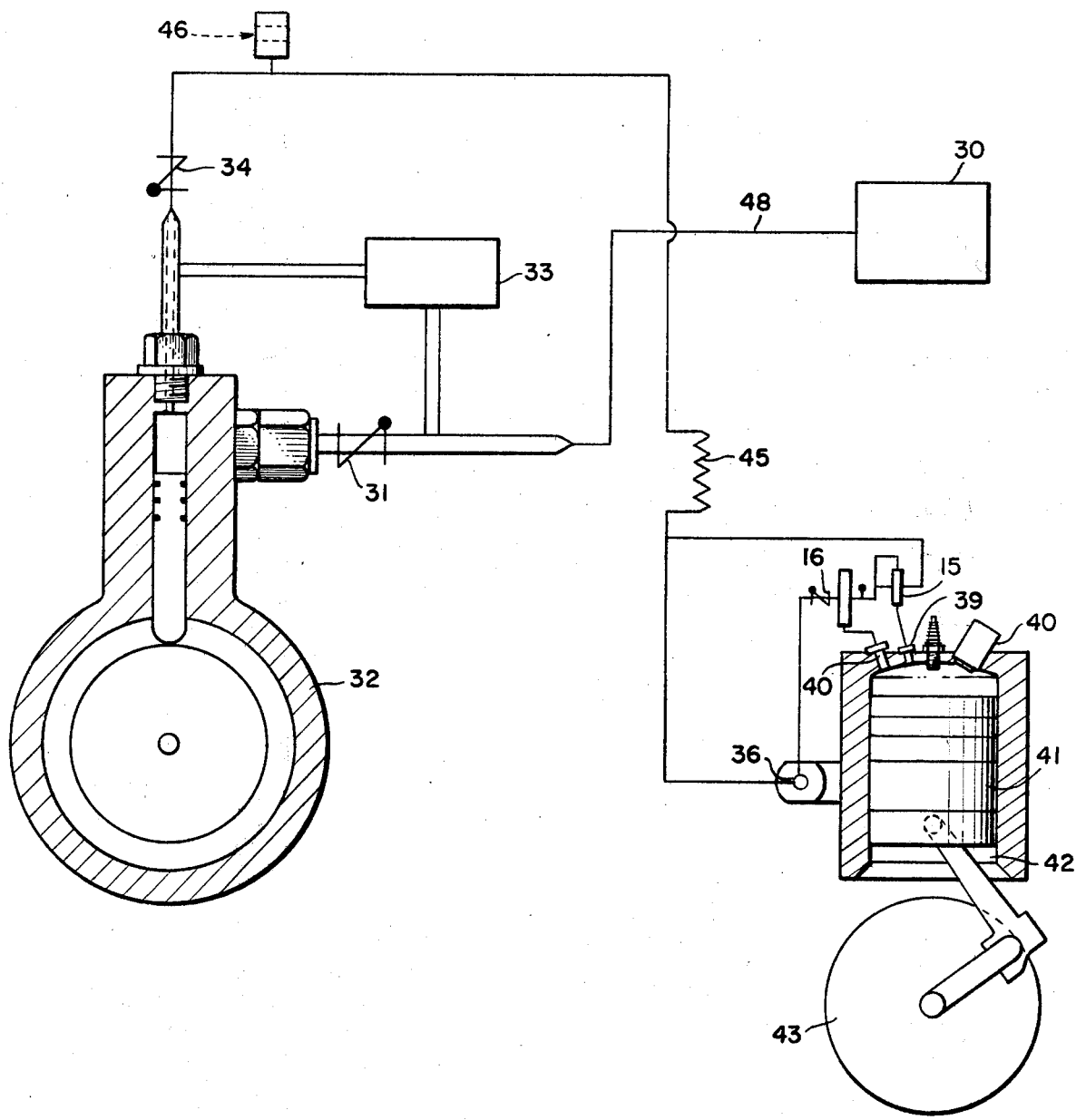
FIG. 1 is a schematic presentation of the Superheated-Water Injection System (SWIS) showing its various parts and their relationship to the workings of the whole system as hooked up to a typical spark-ignited internal combustion engine. The engine type is only representational however, and may be spark-ignited or diesel, mobile or stationary.

A reservoir (30, FIG. 1) stores the water intended for use in the system. (To prevent the difficulties that could arise if water containing dissolved minerals or compounds is used, only distilled water is recommended for use in the SWIS device.) A water line (48) connects a high-pressure, high-temperature water pump (32) (preferably of the gear or positive-displacement type) and the reservoir (30). The pump must have the force needed to develop pressure on the contained water in excess of that created within the engine's carburetor chamber by combustion. The pump may be run by motor or from the fan or engine water-pump belt for which purpose it is provided with the necessary base mounts, pulley and mounting brackets. The pump (32) is equipped with the necessary valves to maintain the required pressure on the water contained in the system, such as the check valves (31 and 34) to prevent the water from backing up, and the adjustable bypass valve (33) to prevent pressure from exceeding desired levels.

Water from the pump (32) is discharged into the water line (35) equipped with a chargeable accumulator (46) designed to work with the bypass valves in keeping water pressure under sustained and uniform high pressure. Subjected to such pressure, the contained water is heated by being passed through a first heat exchanger (45) built into the radiator and then through a second heat exchanger (36) connected to, or cast integrally with, the exhaust manifold. Where necessary, a third heat exchanger developing heat from electricity generated from a generator attached to a power take off may be installed.

As a result of the combined heat and pressure to which the contained water is subjected, it is superheated to the temperature of the exhaust manifold gases which temperature far exceeds 212° F. (100° C.), the boiling point of water at one atmosphere.

The superheated water next passes to the power unit (37), then through another check valve (16) to the injector (15) and finally through a nozzle (18) into the engine's combustion chamber.

Referring now to FIG. 2, the superheated water enters the power unit (37) from line (1) through a check valve (19) into the pressure chamber (2) when the cylinder (3) descends by action of the return springs (7) and (11). When the fuel in the engine's firing chamber is ignited and combusts, the pressure created in the cylinder head drives the power unit piston (3) up against the lower return spring (7) compressing it and applying pressure in turn to the superheated water inside the pressure chamber (2). Pressure-operated check valves (19 and 20) prevent the water from discharging through either pipe (1 and 14) until the pressure generated by engine combustion reaches a predetermined level. At this point the power unit piston (9) moves against the top return spring (11). The distance the power unit piston moves determines the time interval at which the superheated water is evacuated from the power unit pressure chamber (2).

The amount of compression in the top return spring (11) and, consequently, the distance travelled by the piston and the timing of the water injected into the combustion chamber, is adjusted both manually and automatically. Manual adjustment is done by turning the screw shaft (21) in or out using a calibrated nob (22) and a pointer indicator (23) which is turned to the desired point and locked in position by turning the lock nut (30). An automatic timing device designed to compensate for changes in engine speed uses a hydraulic pump (not shown) equipped with a bypass valve which enables it to develop hydraulic pressure in direct proportion to the speed at which the engine operates. Such hydraulic pressure is transmitted through a tube (24) leading to the top of the power unit piston (12) to increase or decrease pressure on the top return spring (11) as the engine speeds up or slows down. The working of such a device is analogous to the spark-advance system found in a car except that, in this case, it is used instead to regulate the frequency at which superheated water is discharged into the engine combustion chamber.

Returning now to the SWIS operating sequence, the superheated water leaves the pressure chamber (2) through a pressure-operated check valve (20) as soon as the desired pressure in the SWIS pressure chamber is attained. The superheated water then flows through a tube (14) into the injector (15) then through another check valve (17) and out through the nozzle (18) into the engine combustion chamber.

The water upon injection into the engine's combustin chamber will flash, or literally explode, into steam. The reason for this is that the superheat that has been imparted into the water by the combination of heat from both the radiator and exhaust manifold gases and the high pressure developed by the SWIS water pump (32) contain sufficient heat energy to effect an instantaneous change of state from liquid to vapor upon release of such superheated water into an environment having a lower ambient pressure than that obtaining within the water injection system.

The operating sequence described means that the superheated water is injected into the engine combustion chamber always at the precise micro- or millisecond after point of ignition. As a result, the steam flashed therefrom develops a usuable work force that exerts pressure against the engine piston incremental to and at a point later than that produced by the gases of combustion, resulting in turn in a stronger and smoother engine stroke than would otherwise be possible from just combusting the fuel.

Stated otherwise, the force of the steam produced from the injection and flashing of superheated water comes to bear against the piston towards the middle or the end of the engine stroke. As a result, two work forces, one emanating from the gases of combustion, the other from the steam flashed from superheated water, commence to exert pressure against the piston sequentially thus developing a compound and evenly distributed work force on the piston, resulting in turn in greater engine torque and smoother engine operation.

These improvements in engine characterestic may be explained by the different manners in which an internal combustion and a steam-powered engine work. An internal combustion engine develops work force by exploding a fuel-air mixture. In a reciprocating engine, such work force, while considerable at the point of combustion, weakens drastically at the end of a stroke resulting in a drastically diminishing power curve. On the ther hand, the pressure developed by flashing water into steam is an even and constant one lasting over the duration of the whole stroke length. By compounding and melding these two differently-sourced and sequential forces to bear on the piston, the operating advantages of an internal combustion engine (a powerful initial force) and those of a steam engine (constant and sustained pressure) are combined to produce a much stronger and smoother power curve on the overall.

It may be pointed out that although the liquid described to be used in the invention is water, other types of liquid or liquid mixtures may be charged into the system. Thus an alcohol-water, or a gasoline-water mixture may be used with equal facility in the device. In such a case the system will not only generate usable steam but also charge a combustible fuel into a hot engine cylinder to precipitate a firing separate from and sequential to that which initiated the combustion cycle.

It may be equally pointed out that while the combustion cycle described in the patent application is descriptive of either a spark-ignited or diesel type engine, the SWIS device may be utilized with similar facility and analogous results in turbines and jet engines. These, however, more properly from the subject of separate patents.

We claim:

1. The design and system for a superheated-water injection system (SWIS) which superheats water under pressure conditions to temperatures above 212° F. (100° C.) while preventing it from boiling, and injects such superheated water into the engine combustion chamber some micro- or milli-seconds after the point of ignition thus flashing the injected superheated water into superheated steam and generating a usable workforce incremental to and separate from that produced by combusting the fuel itself, the principal components of such superheated water injection system consisting of: (a) a water reservoir, (b) a water line, (c) a high-pressure, high-temperature water pump powered either by a motor or from a power take-off run by the engine, such pump being designed both to move water from the reservoir through the whole circuit and to build up and maintain pressure on the water contained in the line in excess of that existing at any time within the combustion chamber of the engine to which the SWIS device is intended to be attached, so as to prevent the water, though superheated, from flashing into steam until it is finally injected into the combustion chamber; (d) an accumulator to maintain water pressure in the circuit at the desired level at all times; (e) a water bypass system equipped with pressure-control valves to prevent water pressure inside the water line from building up beyond a designated maximum, (f) exchangers to transfer heat from the radiator water and/or the exhaust manifold gases and/or an electric heating device to the water passing through the water line; (g) a power unit connected directly to the engine combustion chamber and actuated by the engine's combustion gases a designed to force a timed and metered volume of superheated, pressurized water through the injector into the combustion chamber some micro- or milliseconds after the point of ignition, such power unti consisting of (i) a cylinder and a piston actuated by pressure from combustion gases; (ii) return springs positioned at the top and lower ends of the cylinder piston; (iii) check and pressure-central valves to prevent the contained water from being ejected or backing up until the desired pressure is brought to bear on the piston; (iv) a manually adjusted injection timing-control system consisting of an up-and-down screw installed at the top of the cylinder with a pointer and lock-in device; (v) an automatic injection timing-control system actuated by a hydraulic pump powered from the main engine by belt, gear or any means direct power takeoff and connected to the power piston by a pipe, check valves and pressure relief system designed to maintain a desired pressure directly proportional to the engine speed that is brought to bear on the upper return spring that the distance travelled by piston; and (h) an injector, turned and actuated by the power piston positioned to discharge superheated water into the engine combustion chamber.

2. The design and system as described in claim 1, but with the timing of the injection controlled by an electronic sensing device designed to actuate an electromagnet to push against the power unit piston and/or the injector and release a measured amount of superheated water into the combustion chamber a predetermined number of micro-seconds after the point of ignition.

* * * * *